March 17, 1959  S. L. SHURINA  2,877,691
WORK HOLDING FIXTURE
Filed April 24, 1957  3 Sheets-Sheet 1
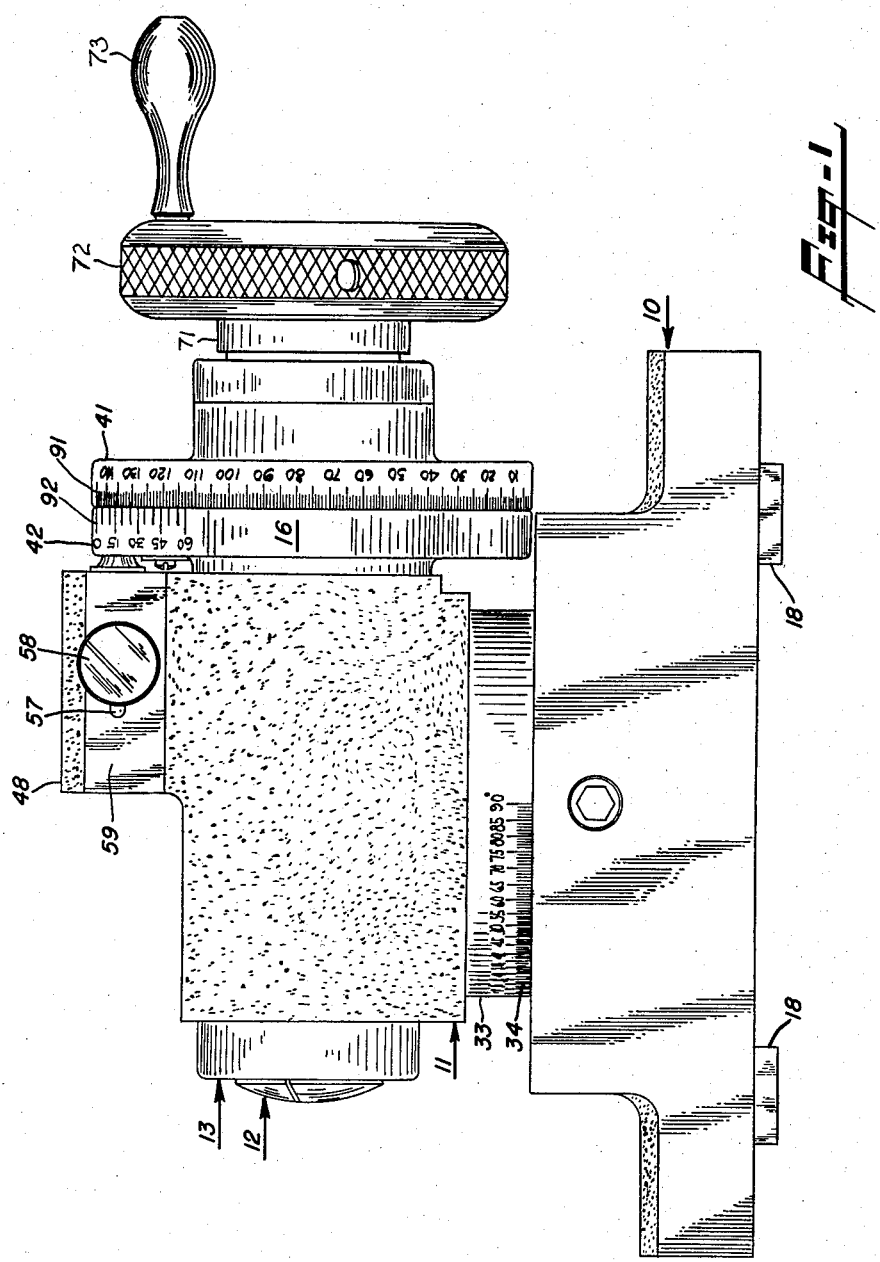
STEPHEN L. SHURINA
INVENTOR
BY Rudolph J. Junick
ATTORNEY March 17, 1959
S. L. SHURINA
2,877,691
WORK HOLDING FIXTURE
Filed April 24, 1957
3 Sheets-Sheet 2
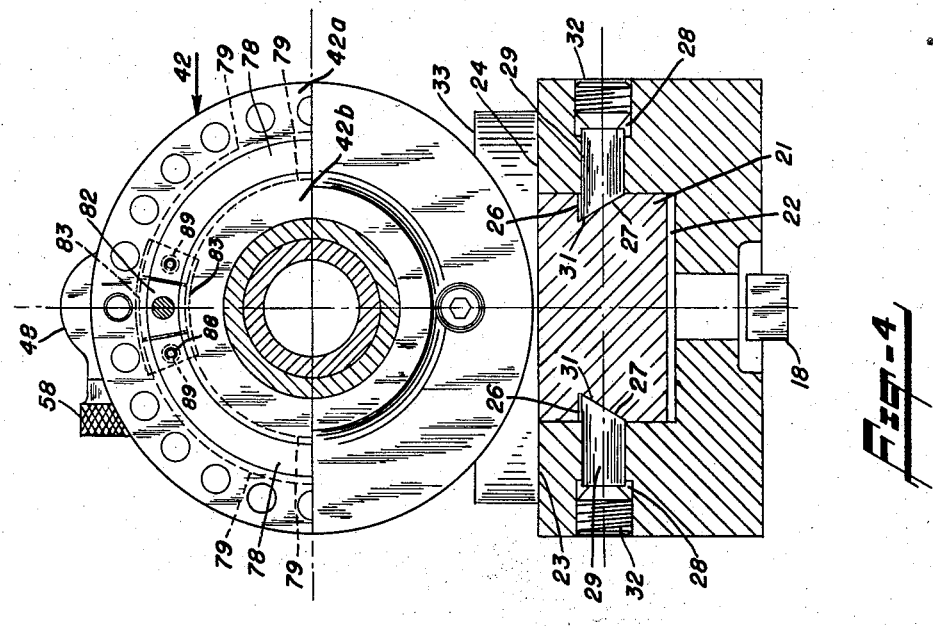
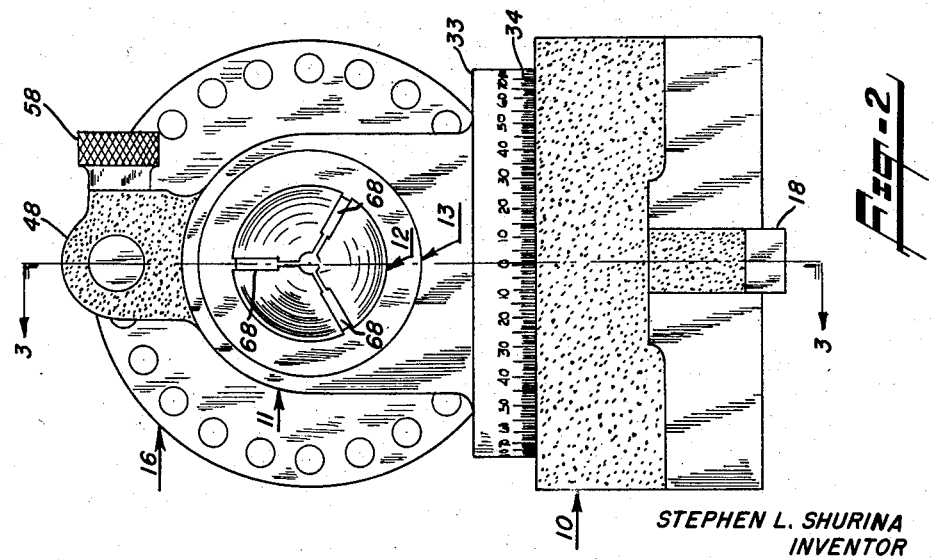
STEPHEN L. SHURINA
INVENTOR
BY Rudolph J. Junick
ATTORNEY March 17, 1959

S. L. SHURINA 2,877,691

WORK HOLDING FIXTURE

Filed April 24, 1957

STEPHEN L. SHURINA
INVENTOR
BY Rudolph J. Zwick
ATTORNEY

United States Patent Office 2,877,691
Patented Mar. 17, 1959

2,877,691

WORK HOLDING FIXTURE

Stephen L. Shurina, Union, N. J.

Application April 24, 1957, Serial No. 654,936

6 Claims. (Cl. 90—57)

This invention relates to a work holding fixture and particularly to a work holder having an indexing means for accurately and precisely positioning the work.

The work holding fixture of my invention is adapted for use with machine tools for supporting the work relative to the cutting tool and may be used in a conventional lathe milling attachment or on a drill press or milling machine to accurately locate the work.

An object of this invention is the provision of a work holding fixture which is simple in construction and capable of rapidly and accurately positioning a work piece on a machine tool.

An object of this invention is the provision of a work holder which is adapted for rotating a work piece about either, or both, of two perpendicularly oriented axes, with precision and accuracy.

An object of this invention is the provision of an indexing means, including a vernier scale, incorporated in a work holding fixture for precision location of the work relative to the cutting device of a machine tool.

An object of this invention is the provision of a work holding fixture comprising a housing member having a bore therethrough, a sleeve member extending through and outwardly beyond the said bore, a vernier ring rotatably mounted on the said sleeve member adjacent the said housing member, index means on the said vernier ring and housing member, vernier locking means locking the said vernier ring against the rotational movement in any index position, a scale ring mounted adjacent the said vernier ring on the said sleeve and secured against relative rotational movement with the sleeve; means selectively locking the said scale ring to the said vernier ring, a work holding device positioned in the said sleeve member, and means operating the said work holding device, the said last-mentioned means and the said sleeve member having cooperating surfaces which are interengaged by operation of the said last-mentioned means in clamping work in the work holding device.

An object of this invention is the provision of a work holding fixture comprising: a housing member having a tapered bore therethrough, a sleeve member rotatably positioned in the said bore and having a tapered outer wall for cooperative engagement with the said tapered bore in the said housing member, the said sleeve member having an outwardly tapered bore portion at one end thereof, a spindle member rotatably positioned in the said sleeve member, the said spindle member having a bore axially extending therethrough, an outwardly radially extending flange on the said spindle member and bearing at one side against the other end of the said sleeve member, a work holding device having an outwardly extending taper positioned in said sleeve member, the taper on the work holding device being in engagement with the outwardly tapered bore portion of the said sleeve member, means operatively engaging the said work holding device with the said spindle member whereby rotation of the said spindle moves the said work holding device axially and clamps work to be machined in the work holding device and frictionally engages the said spindle member and sleeve member, a vernier ring rotatably mounted on the said sleeve member and having spaced index holes, means including a retractable member mounted on the housing member for selectively engaging said index holes and angularly positioning the said vernier ring on the said sleeve member, a scale ring fastened to the said sleeve member and positioned adjacent the said vernier ring, and releasable means locking the said vernier ring to the said scale ring for rotation with the said scale ring upon rotation of the said spindle member when the said spindle and sleeve members are frictionally engaged and the said retractable member and vernier ring are disengaged, the ring member being adapted for further rotation with rotation of the said spindle member when the said retractable member engages the index holes in the vernier and the said releasable means locking the said vernier and scale rings is in an unlocked position.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 1 is a side elevational view of my novel work holding fixture;

Figure 2 is a front view of the device;

Figure 4 is a view taken on line 4—4 of Figure 3.

Figure 3:
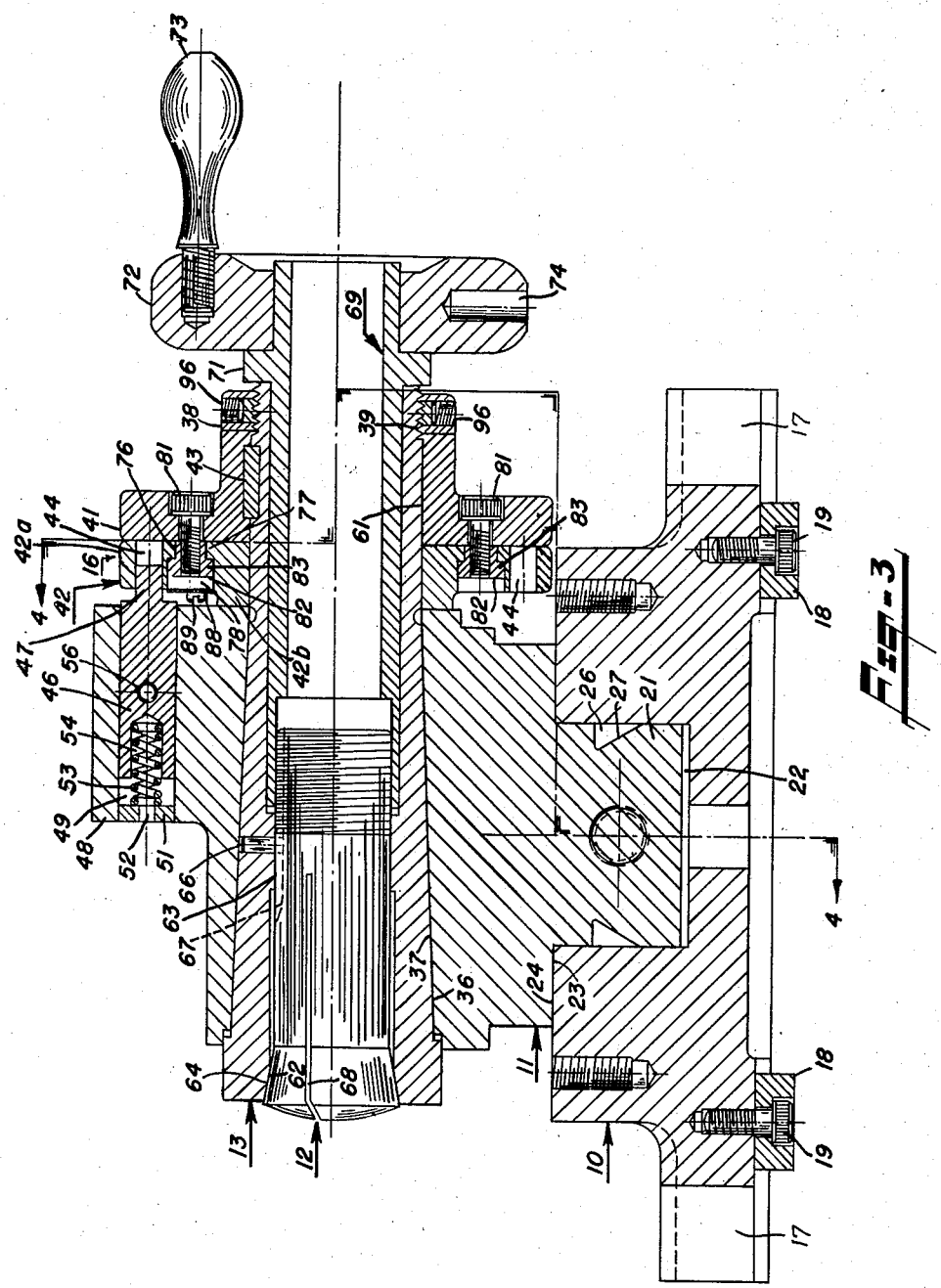
Figure 3 is a view taken on line 3—3 of Figure 2.

Referring to Figures 1 and 2 of the drawings, the work holding device comprises, generally, a base member 10 which pivotally supports a housing 11. A work holding device 12 is supported within the bore of a sleeve member 13, which is adapted to be rotated; the degree of rotation being accurately controlled by use of an indexing means 16.

Referring now to Figure 3 of the drawings, the base member 10 is shown provided with a pair of notches 17 at the front and rear ends thereof through which fastening devices, not shown, may extend for the purpose of securely fastening the device to the work table or bed of a machine tool. The bottom plane surface of the base member is ground smooth so as to accurately seat upon the work table. A pair of cleat members 18 may be bolted with bolts 19 to the bottom of the base member and provide guide means which are adapted to cooperate with guideways in the work table to which the device is attached, thereby aiding in precisely locating the device on the work table.

The housing member 11 is pivotally supported upon the base member 10 through a pivotal connection which includes a large cylindrical-shaped boss 21 rotatably mounted in a hole 22 in the base member, as best seen in Figures 3 and 4. The top surface 23 of the base member and the lower surface 24 of the housing member adjacent the boss are machined smooth and provide thrust bearing surfaces between the members. In this way, the housing member is pivotal about the vertical axis of the boss.

To lock the housing member in position, relative to the base member, I provide a circumferential groove 26 on the boss 21 having an upwardly inclined side wall 27. Holes 28, having outer threaded portions, are positioned in the base member adjacent the groove 26. A cylindrical-shaped pin member 29 having a beveled end 31, which is properly contoured to match the wall 27 of the groove, is positioned in each of the holes 28. Set screws 32 threadedly positioned in the threaded ends of the holes 28, are used to force the pin members 29 inwardly against the inclined wall of the groove. When the set screws are tightened, the cooperating inclined surfaces on the pin and groove result in a downwardly directed force on the boss and housing member whereby the thrust bearing surfaces 23 and 24 are brought into tight frictional engagement. When the set screws are loosened, the housing member 11 is easily rotated on the base member 10. A cylindrical surface 33, as best seen in Figure 2, which is coaxial with the boss 21 and positioned on the housing member 11, is provided with suitable angular graduation marks designated 34. An indexing mark, not shown, is provided on the base member 10 adjacent the marks 34, whereby the relative angular position between the base member and housing is accurately indicated.

The housing member 11, as best seen in Figure 3 of the drawings, is provided with a tapered bore 36, the axis of which extends perpendicularly to, and intersects the axis of the boss 21 extended. The bore 36 is adapted to receive and rotatably support the sleeve member 13, which has a tapered outer wall portion 37, in cooperating engagement therewith. The complementary tapered bearing surfaces 36 and 37 prevent axial movement of the sleeve member 13 in the housing member 11 in one direction. Axial movement in the other direction is prevented by means of a threaded collar member 38, which engages a threaded end 39 of the sleeve member 13. The collar bears against the indexing means designated 16, which is positioned between the housing member 11 and collar.

The indexing means 16, which is used to accurately angularly position the sleeve member 13, includes annular scale and vernier rings 41 and 42, respectively. The scale ring 41 is attached to the cylindrical-shaped portion of the sleeve 13, which extends beyond the end of the housing 11, by means of a key 43 fitting within longitudinally extending keyways in the sleeve and scale ring, thus prohibiting relative rotary movement between the sleeve and scale rings. The vernier ring 42 is rotatably mounted on the sleeve member 13 and positioned between the end of the housing member 11 and the scale ring 41.

The vernier ring 42 is provided with a plurality of index holes 44 extending longitudinally thereof. In the embodiment of the invention shown in the drawings, I provide twenty-four (24) equally spaced index holes which provide an angular spacing of 15 degrees. A greater, or lesser number of equally spaced index holes may be provided, if desired.

A retractable index pin 46, having a tapered end 47 adapted to selectively engage the index holes 44 is supported for longitudinal movement in an index pin housing 48 integrally formed with the housing member 11. The index pin housing 48 has a longitudinally extending bore 49 aligned with the index holes 44 within which the index pin is adapted to slide. One end of the bore 49 is closed with a plate member 51 having a centrally located pin 52 extending inwardly thereof. The index pin 46 is spring biased into engagement with the index holes in the vernier ring by means of a spring 53 positioned between the plate member 51 and the index pin 46, and held in position therebetween by means of the pin 52 and a hole 54 in the end of the index pin 46 within which the spring is positioned. A shaft 56 threadedly engages a threaded hole in the side of the index pin and extends outwardly through an elongated slot 57 (see Figure 1) in the side of the index pin housing 48. A knob 58 is attached to the end of the shaft; the inner surface of the knob slidably engaging a smooth machined surface 59 on the index pin housing 48. The index pin 46 is retracted from an engaged position with the index holes 44 by simply moving the knob in a forward direction against the spring bias action provided by the spring 53.

The bore in the sleeve member 13, which is designated 61, has an outwardly flared, or tapered, portion 62 at one end and an internal flange 63 intermediate the ends thereof. The work holding device, or collet chuck, 12, having a bore coaxial with the bore 61 in the sleeve member and an outwardly tapered end surface 64, is positioned in the sleeve member with the tapered surface 64 in engagement with the flared, or tapered, portion 62 of the sleeve member, and the cylindrical portion thereof in engagement with the internal flange 63. A radial pin 66, which is secured to the sleeve member 13, projects into a longitudinal keyway 67 formed in the work holding device whereby relative rotary movement between the sleeve member and work holding device is prohibited. A plurality of longitudinally extending slots 68 are provided through the side walls of the work holding device 12 and permit the diameter of the work holding device bore to be decreased upon relative axial movement of the sleeve member and work holding device, due to the coaction of the tapered surfaces 62 and 64 thereon.

Axial movement of the work holding device 12 in the sleeve member 13 is obtained by means of a hollow spindle member 69, which is rotatably mounted in the other end of the sleeve member 13. The spindle member 69 is provided with a threaded end for engagement with the work holding device 12, and has an external flange 71 which engages the end of the sleeve member 13 at one side thereof. A disc shaped handle 72 is suitably secured to the end of the hollow spindle member 69 and is provided with a knob-type handle 73 for rapid turning thereof. A radial hole 74 is located in the periphery of the handle 73 within which a rod, or bar, not shown, may be inserted thereby providing increased leverage to rotate the handle, and spindle, if desired.

The indexing means 16, which includes the scale ring 41 and vernier ring 42, are utilized in positioning the clamped work piece at any desired angle. A releasable locking means is included between the scale and vernier rings for locking the two rings together. As best seen in Figures 3 and 4, the vernier ring 42 comprises two separate concentric annular ring members designated 42a and 42b. The outer-most annular ring member 42a is provided with an internal annular flange 76 while the inner-most annular ring member 42b is provided with a radially spaced external annular flange 77. The two ring members 42a and 42b are held in a coaxial position by a pair of arcuate separating members 78 positional therebetween. The arcuate separating members are provided with shoulders 79 (as seen in Figure 4) which abut the annular flanges 76 and 77 on the vernier ring members 42a and 42b, respectively. The separating members 78 fit loosely enough between the vernier ring members to permit relative rotary movement therebetween. The releasable locking means, comprising bolts 81 and short arcuate-shaped nut members 82, are included between the scale and vernier rings 41 and 42, respectively, for locking the two rings together. Shoulders 83 on the nut members 82 abut the flanges 76 and 77 on the outer and inner vernier ring members 42a and 42b, respectively. When the bolt and nut locking means are loosened, relative rotary movement is permitted between the scale ring 41 and vernier ring members 42a and 42b. When the bolt and nut locking means are tightened, the vernier ring members 42a and 42b are brought into axial abutting relation with the scale ring 41 thereby frictionally securing the rings together against relative movement. A plate 88 is secured between the arcuate separating members 78, 78 by the bolts 89 and prevents the nut member 82 from falling out of position between the ring members 42a and 42b, if the bolt and nut locking members become disengaged.

In order to clamp a work piece in the work holding device 12, the sleeve member 13 is held against rotary motion by positioning the index and locking pin 46 in one of the index holes 44 in the outer vernier ring member 42a. This locks the outer vernier ring member 42a against relative rotary movement with the housing member 11. The locking means between the scale and vernier rings 41 and 42, respectively, are also locked, thereby preventing relative rotary movement therebetween. Because the scale ring is keyed to the sleeve member 13, relative rotary movement of the sleeve member with the scale ring is prevented. The handle 72 and spindle member 69 are rotated in a direction which results in relative axial movement of the work holding device 12 in the sleeve member 13, retracting the work holding device inwardly of the sleeve member. Through the coaction of the tapered surfaces 62 and 64, as described above, the diameter of the bore of the work holding device will be decreased, thus clamping a work piece, not shown, in position in the bore.

Rotation of the handle 72 to clamp the work piece in the device results in the flange 71 frictionally engaging the end of the sleeve member 13. The handle may then be used to rotate the sleeve member 13 to any desired angular position after disengaging the retractable index and locking pin from the index holes 44, or by unlocking the locking means between the scale and vernier rings 41 and 42, respectively.

As seen in Figure 1, the scale ring 41 is provided with graduation marks 91 which are spaced one (1) angular degree apart. The vernier ring is provided with graduations designated 92, which cooperate with the graduations 91 on the scale ring. The vernier scale, as shown, subdivides the movement of the scale ring into five (5) minutes of angular rotation. The sixty (60) minutes of angular graduation on the vernier scale have been spread out over thirty-three (33) degrees on the scale ring 41 whereby any of the five (5) minute markings on the vernier ring are aligned with the desired scale ring markings three (3) degrees apart. It will be understood that the vernier scale 92 could be extended over a greater angular range and divided into a greater number of graduations, if desired. The vernier shown is preferred in most instances because it is easy to use and of sufficient accuracy in many machine tool operations.

In the operation of the index and vernier mechanisms of my device, the work piece is first clamped in the work holding device 12 in the manner described above. In order to clamp the work piece, the index pin 46 must engage the index holes 44 in the vernier ring member 42a and the scale ring 41 and vernier ring 42 locked together by the bolt and nut locking means 81 and 82, respectively. In the illustration of Figure 1, the zero mark on the vernier ring 42 is positioned adjacent the 145 degree mark on the scale ring 41 in the locked position of the members. For purposes of description, assume that it is desired to rotate the work piece 25 degrees and 10 minutes from the initial position shown. The operator first moves the spring-biased index pin 46, by means of the attached handle 58, out of engagement with the index hole 44 within which it is positioned in the vernier ring 42. The handle 72 is then rotated to a position wherein an adjacent index hole 44 is aligned with the index pin 46 at which point the spring 53 forces the index pin into the index hole. This, then, rotates the work piece 15 degrees; the index holes 44 being spaced 15 degrees apart. The operator then loosens the bolts 81 from the nuts 82 and continues to rotate the handle 72 another 10 degrees as indicated by the graduations 91 on the scale ring 41 which are moved relative to the now fixed vernier ring 42. This brings the 135 degree mark on the scale ring adjacent the zero mark on the vernier ring. The operator continues rotating the handle 72 in the same direction until the 15 minute mark on the vernier ring is in alignment with the adjacent degree mark on the scale ring which, in this example, would be the 126 degree mark. The operation may be repeated, and any number of times and a plurality of accurately angularly spaced machining operations performed. If the work piece is being drilled axially of the bore of the work holding device, for example, a plurality of equally spaced holes may be drilled. The holes may be drilled at an angle to the bore of the work holding device by rotating the housing 11 about the base member 10 on the boss 21.

Provision is made to compensate for wear between the cooperating tapered surfaces on the sleeve member 13 and in the housing member 11. As the surfaces wear, the sleeve member extends further through the bore to the right, as viewed in Figure 3. The collar member 38 is adjustable on the end of the sleeve member and may be turned forward by first loosening set screws 96 in the collar and then turning the collar up further on the sleeve member. The scale and vernier rings 41 and 42, respectively, are thus held in an adjacent relation between the housing 11 and collar 38 for accurate readings on the scale and vernier rings.

Thus it is seen that I have provided a work holding fixture which is capable of accurately positioning a work piece with respect to a machine tool, and which enables the operator to quickly set up the machining operation.

Having now described my invention in detail, in accordance with the patent statutes, various changes and modifications will suggest themselves to those skilled in this art. It is intended that such changes and modifications shall fall within the spirit and scope of the invention as recited in the following claims.

I claim:

1. A work holding fixture comprising a housing member having a bore therethrough, a sleeve member extending through and outwardly beyond the said bore in the said housing member, a vernier ring rotatably mounted on the said sleeve member adjacent the said housing member, a combination index and locking means on the said vernier ring and housing member for locking the said vernier ring against rotational movement in any index position, a scale ring mounted adjacent the said vernier ring on the said sleeve and secured against relative rotational movement with the said sleeve, means selectively locking the said scale ring to the said vernier ring, a work holding device positioned in the said sleeve member, and means operating the said work holding device, the said last-mentioned means and the said sleeve member having cooperating surfaces which are interengaged by operation of the last-mentioned means in clamping work in the work holding device.

2. The invention as recited in claim 1 wherein the said sleeve member has an outwardly tapered bore portion at one end thereof, the said work holding device having an outwardly extending tapered portion positioned in the said sleeve member with the said tapered surfaces in engagement, the said work holding device having a work receiving bore coaxial with the said housing member bore, the said means operating the said work holding device including a spindle threadedly engaged with the said work holding device whereby rotation of the said spindle moves the work holding device axially and clamps work to be machined therein.

3. A work holding fixture adapted to be positioned on the work table of a machine tool and comprising a housing member having a tapered bore therethrough, a sleeve member having a tapered outside wall concentric and adjacent the said tapered bore in the housing member, the said sleeve member extending beyond the end of the said housing member, a vernier ring rotatably mounted on the said sleeve member adjacent the said housing member, a scale ring mounted on the said sleeve member for rotation therewith adjacent the said vernier ring, a combination index and locking means on said vernier ring and housing member, whereby the said vernier ring may be locked against rotational movement in any indexed position, means selectively locking the said scale ring to the said vernier ring, a work holding device positioned in the said sleeve member and adapted to clampingly engage work to be machined, means operating the said work holding device, the last-mentioned means and sleeve member having cooperating surfaces which are interengaged by operation of the last-mentioned means after work is clamped in the said work holding device whereby rotation of the said last-mentioned means after work is clamped in the said work holding device is effective to rotate the said sleeve member and work relative to the housing member when the said combination, index and locking means are unengaged and also effective to further rotate the said sleeve and work relative to the housing member when the said combination index and locking means are engaged and the said selectively operated locking means between the said scale ring and vernier is unengaged.

4. The invention as recited in claim 3 including a base member, means rotatably supporting the said housing member on the said base member, the said means including a large cylindrical-shaped boss extending perpendicularly of the said bore in the housing, means forming a boss-receiving hole in the said base member rotatably receiving the said boss, a circumferential groove on the boss having an upwardly tapered wall portion, means forming a cylindrical-hole in the base member perpendicular to the boss receiving hole therein and adjacent the upwardly tapered wall portion of the said boss, a cylindrical-shaped pin having a beveled end positioned in the said cylindrical hole, and means forcing the said beveled end of the said pin against the tapered wall portion of the groove in the boss thereby urging the said boss downwardly into the said boss receiving hole thereby frictionally interengaging the said base and housing members.

5. A work holding fixture adapted to be positioned on the work table of a machine tool comprising: a housing member having a tapered bore therethrough, a sleeve member rotatably positioned in the said bore and having a tapered outer wall for cooperative engagement with the said tapered bore in the said housing member, the said sleeve member having an outwardly tapered bore portion at one end thereof, a spindle member rotatably positioned in the said sleeve member, the said spindle member having a bore axially extending therethrough, an outwardly radially extending flange on the said spindle member and bearing at one side against the other end of the said sleeve member, a work holding device having an outwardly extending taper positioned in said sleeve member, the taper on the work holding device being in engagement with the outwardly tapered bore portion of the said sleeve member, means operatively engaging the said work holding device with the said spindle member whereby rotation of the said spindle moves the said work holding device axially and clamps work to be machined in the work holding device and frictionally engages the said spindle member and sleeve member, a vernier ring rotatably mounted on the said sleeve member and having spaced index holes, means including a retractable member mounted on the housing member for selectively engaging said index holes and angularly positioning the said vernier ring on the said sleeve member, a scale ring fastened to the said sleeve member and positioned adjacent the said vernier ring, and releasable means locking the said vernier ring to the said scale ring for rotation with the said scale ring upon rotation of the said spindle member when the said spindle and sleeve members are frictionally engaged and the said retractable member and vernier ring are disengaged, the ring member being adapted for further rotation with rotation of the said spindle member when the said retractable member engages the index holes in the vernier and the said releasable means locking the said vernier and scale rings is in an unlocked position.

6. The invention as recited in claim 5 including a base member, means rotatably supporting the said housing member on the said base member, the said means including a large cylindrical-shaped boss extending perpendicularly of the said bore in the housing, means forming a boss-receiving hole in the said base member rotatably receiving the said boss, a circumferential groove on the boss having an upwardly tapered wall portion, means forming a cylindrical hole in the base member perpendicular to the boss receiving hole therein and adjacent the upwardly tapered wall portion of the said boss, a cylindrical-shaped pin having a beveled end positioned in the said cylindrical hole, and means forcing the said beveled end of the said pin against the tapered wall portion of the groove in the boss thereby urging the said boss downwardly into the said boss receiving hole thereby frictionally interengaging the said base and housing members.

References Cited in the file of this patent

UNITED STATES PATENTS

| | | |
|---|---|---|
| 1,110,389 | Jeffery et al. | Sept. 15, 1914 |
| 1,865,552 | Banlwitz | July 5, 1932 |
| 2,059,753 | Scott | Nov. 3, 1936 |